March 11, 1969  W. J. EHNER ET AL  3,431,720
DUAL SCALE INTERVAL TIMER
Filed March 10, 1966

INVENTORS
WILLIAM J. EHNER
GERALD K. LOSERT
BY Henry J. Moissit
ATTORNEY

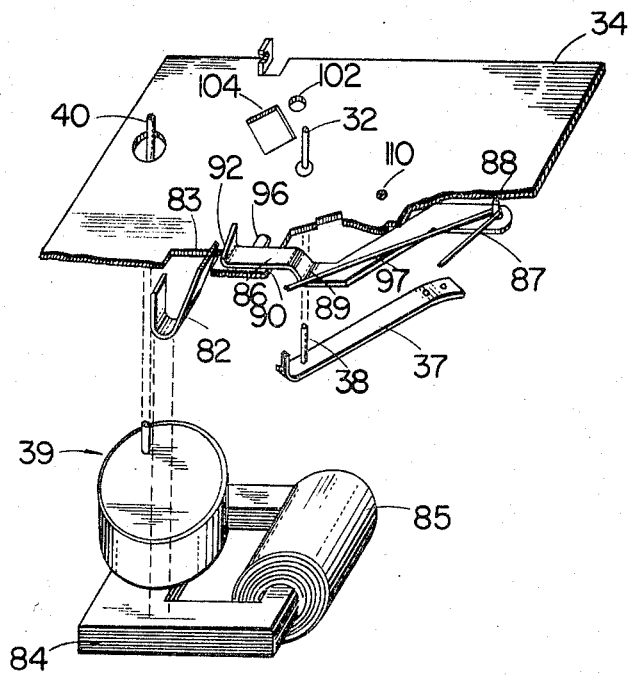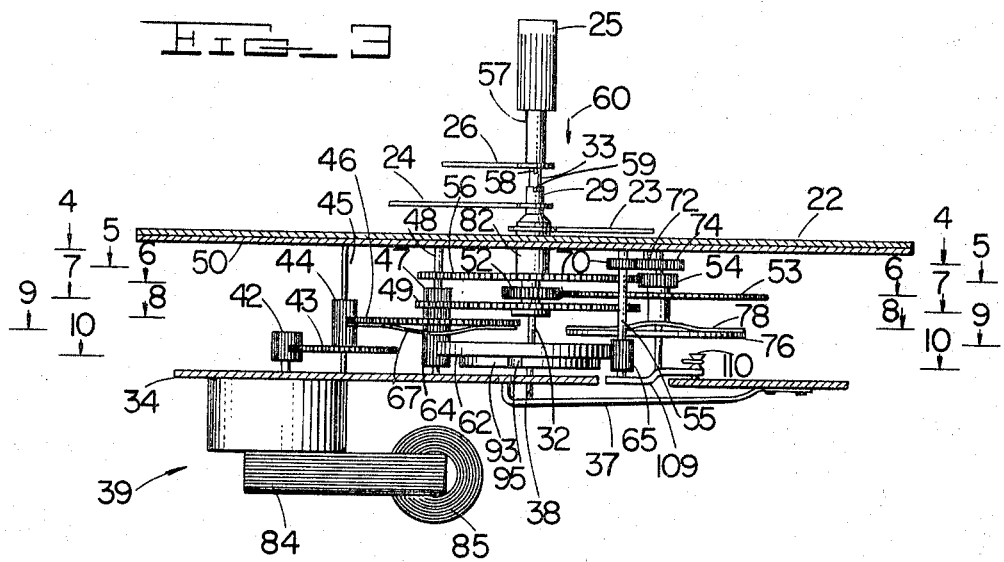

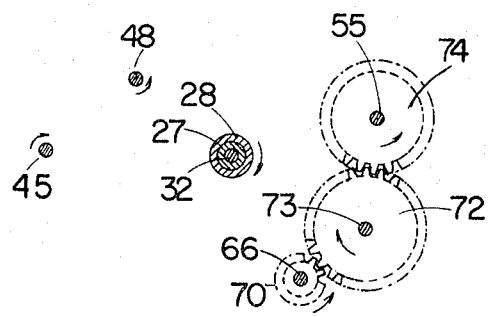
FIG_4
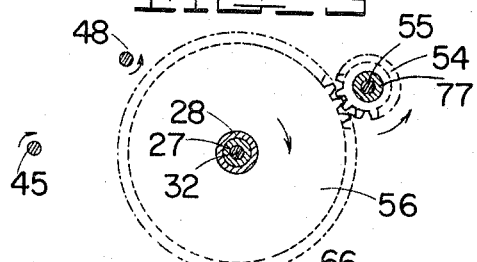
FIG_5
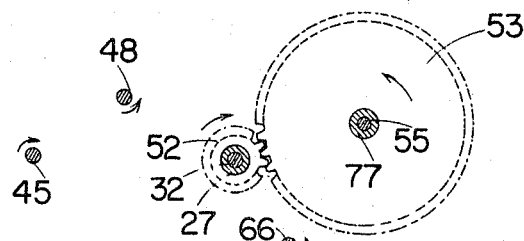
FIG_6
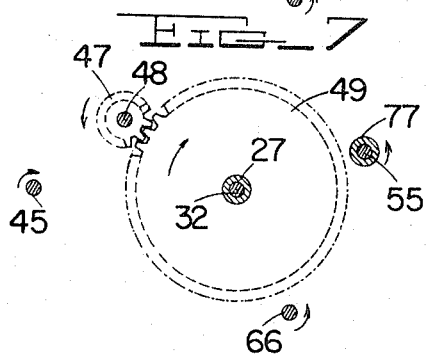
FIG_7
INVENTORS
WILLIAM J. EHNER
GERALD K. LOSERT
BY
ATTORNEY

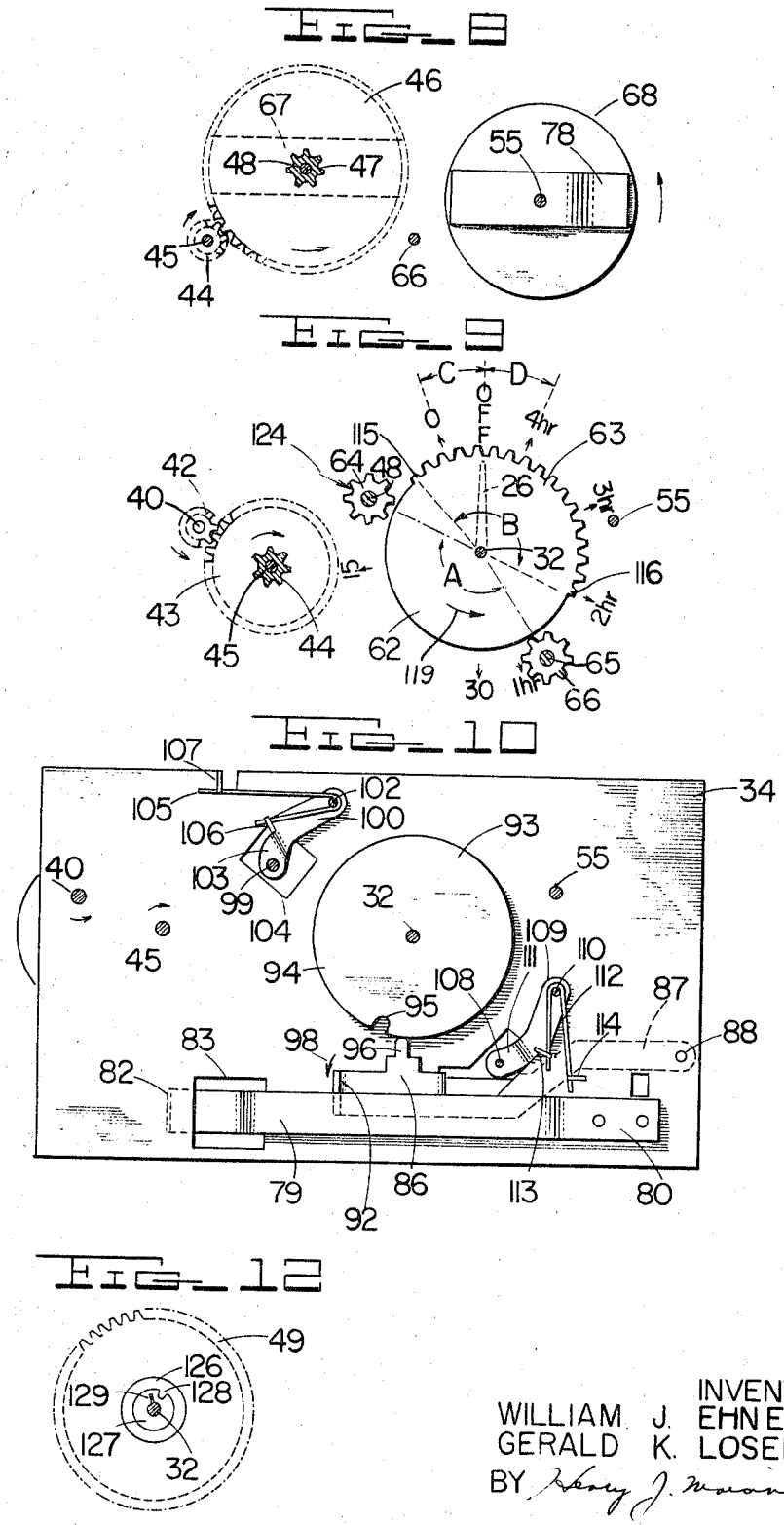

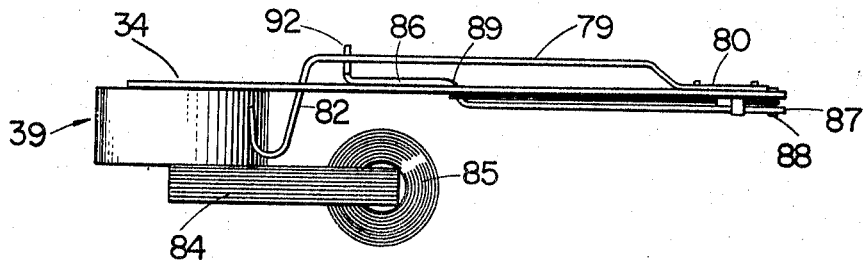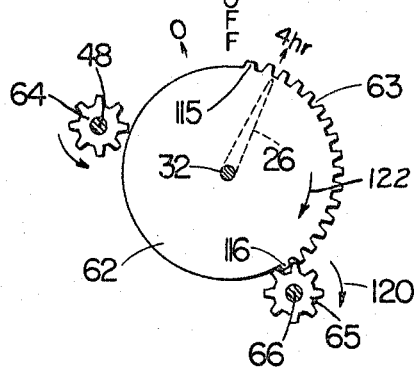

United States Patent Office 3,431,720
Patented Mar. 11, 1969

3,431,720
DUAL SCALE INTERVAL TIMER
William J. Ehner, Louisville, Ky., and Gerhard K. Losert, Morrison, Ill., assignors to General Electric Company, a corporation of New York
Filed Mar. 10, 1966, Ser. No. 533,354
U.S. Cl. 58—22.9                              8 Claims
Int. Cl. G04f 3/02

ABSTRACT OF THE DISCLOSURE

A dual scale interval timer having a dial with first and second sequentially arranged time scales thereon. A rotatable time indicating member is provided having a sector gear of predetermined angular extent connected thereto, the time indicating member and sector gear being manually rotatable in one direction from a zero time setting at the end of the second scale to a selected timed interval setting. First and second driving pinions are provided arranged to be successively meshed, one at a time, with the sector gear to drive the time indicating member from the selected timed interval setting to the zero time setting in a direction opposite the one direction so as to measure the selected timed interval, the first pinion being in mesh and the second pinion being out of mesh with the sector gear at the selected timed interval setting. A synchronous motor is coupled by a gear train to the driving pinions to drive them at first and second predetermined speeds, respectively. The first driving pinion initially drives the sector gear and the time indicating member from the selected timed interval setting on the first time scale at the first predetermined speed to the starting end of the second time scale at which point the second pinion moves into mesh and the first pinion moves out of mesh with the sector gear.

---

This invention generally relates to interval timing devices and more particularly to an improved dual scale interval timer.

Dual scale interval timers are devices for timing relatively short and longer intervals of time and are used in applications, such as baking ovens, photographic processing and many others. Ordinarily such interval timers are driven by a small synchronous timing motor and are provided with a setting indicator for manually preselecting the interval to be timed. The setting indicator is coupled with a motor driven gear train by a slip clutch so that rotation of the setting indicator during the setting operation slips the clutch and prevents the setting motion from being transmitted back to the timing motor. Once the setting operation has been completed, the timing motor drives the setting indicator through the gear train. When the preselected interval has elapsed, an audible signal buzzer or switch is actuated.

Where an interval timer is provided with a dial having uniform spacing between the units of time indicated thereon, e.g., each ten minute interval would occupy the same angular space on the dial. In certain applications of interval timers, it is necessary to provide a maximum time interval of four hours. Obviously, in such applicatons the angular space on the dial between ten minute intervals would be extremely small and short intervals could not be accurately selected or timed. For such applications, it is therefore desirable to provide a dual scale with an expanded scale on the dial for the short time intervals so that the angular space on the dial for 0 to 30 minutes, for example, is about the same as the angular space for settings between 30 minutes to four hours. Such an expanded scale arrangement requires that the setting indicator be driven at two different rates of speed, i.e., at a slow rate of speed during the compressed scale interval and at a faster rate of speed during the remaining expanded scale interval. Thus, such an arrangement provides accurate timing for short intervals while also permitting the timing of much longer intervals.

Expanded scale interval timers have been proposed in the past. A typical construction is shown in United States Patent No. 2,786,525 granted to Vigneaux and assigned to the assignee of the present application. Such prior expanded scale interval timers are, however, characterized by their general complexity. It is desirable to provide a dual scale interval timer which utilizes a minimum number of operating component parts and which can be economically fabricated. It is further desirable that the scale expanding arrangement be readily adapted for use with a conventional clock mechanism.

Accordingly, it is a general object of the invention to provide an improved dual scale interval timer.

A more specific object of our invention is to provide an improved gear mechanism in a dual scale interval timer.

In accordance with one form of our invention we have provided an improved dual scale interval timer having a dial face with a first and second time scale with timed interval settings marked thereon and also having a rotatable time indicating member with a sector gear of predetermined angular extent. The rotatable time indicating member includes a means for manually rotating the time indicating member in one direction to a selected time interval setting on the dial face. A first and a second rotatable driving pinions are adapted to be successively meshed with the sector gear to drivingly engage the sector gear and drive the time indicating member from the selected timed interval setting to a zero time setting in a direction opposite to the drection in which the time indicating member is manually rotated.

A driving gear means is coupled with a synchronous electric motor and the first and second driving pinions in order to drive the first and second driving pinions and thereby the time indicating member at a first and a second predetermined speed. When the time indicating member is manually rotated to a selected time interval setting on the first scale, the first driving pinion drives the sector gear and time indicating member from the selected timed interval setting to the lowest timed interval setting on the first time scale at the first predetermined speed. The second driving pinion then engages the sector gear to drive the sector gear and the time indicating member at the second predetermined speed to the zero time setting through the second time scale.

When the time indicating member is rotated to a selected timed interval setting on the second scale, the second driving pinion drives the sector gear and the time indicating member at the second predetermined speed to return the time indicating member to the zero time setting. The selected timed interval is measured by the time required to drive the indicating member from the selected timed interval setting on the second scale to the zero time setting. When the time indicating member reaches the zero time setting, a buzzer or a switch may be actuated by the time indicating member.

The above-mentioned and other features and objects of this invention and the manner of attaining them will become more apparent and the invention itself will be best understood by reference to the following description of an embodiment of the invention taken in conjunction with the accompanying drawings, wherein:

FIGURE 2 is a fragmentary exploded perspective view, partly broken away, showing the remaining operative parts of the interval timer of FIGURE 1 which are disposed below the base plate;

FIGURE 3 is a side view, partially in section, of the interval timer of FIGURES 1 and 2;

FIGURE 4 is a fragmentary sectional view taken generally along the line 4—4 of FIGURE 3 and showing the gears in a plane passing generally through line 4—4;

FIGURE 5 is a fragmentary sectional view taken generally along the line 5—5 of FIGURE 3 and showing the gears in a plane passing generally through line 5—5;

FIGURE 6 is a fragmentary sectional view taken generally along the line 6—6 of FIGURE 3 and showing the gears in a plane passing generally through line 6—6;

FIGURE 7 is a fragmentary sectional view taken generally along the line 7—7 of FIGURE 3 and showing the gears in a plane passing generally through line 7—7;

FIGURE 8 is a fragmentary sectional view taken generally along the line 8—8 of FIGURE 3 and showing the gears in a plane passing generally through line 8—8;

FIGURE 9 is a fragmentary sectional view taken along the line 9—9 of FIGURE 3 and showing the gears in a plane passing generally through line 9—9, the gears being shown for the "OFF" position of the interval timer;

FIGURE 10 is a fragmentary sectional view taken generally along the line 10—10 of FIGURE 3 and showing the base plate;

FIGURE 11 is a fragmentary side view of the base plate and timing motor assembly;

FIGURE 12 is a view of a gear and hub portion carried on the indicator or setting shaft;

FIGURE 13 is a fragmentary sectional view similar to FIGURE 9 and showing the interval timer parts at the maximum interval setting;

FIGURE 14 is a fragmentary sectional view similar to FIGURES 9 and 13 and showing the gear parts at their intermediate position between the expanded and compressed scales; and FIGURE 15 is a fragmentary cross-sectional view similar to FIGURES 9, 13 and 14 and showing the gear parts in a position at the end of a timing interval.

Figure 1:
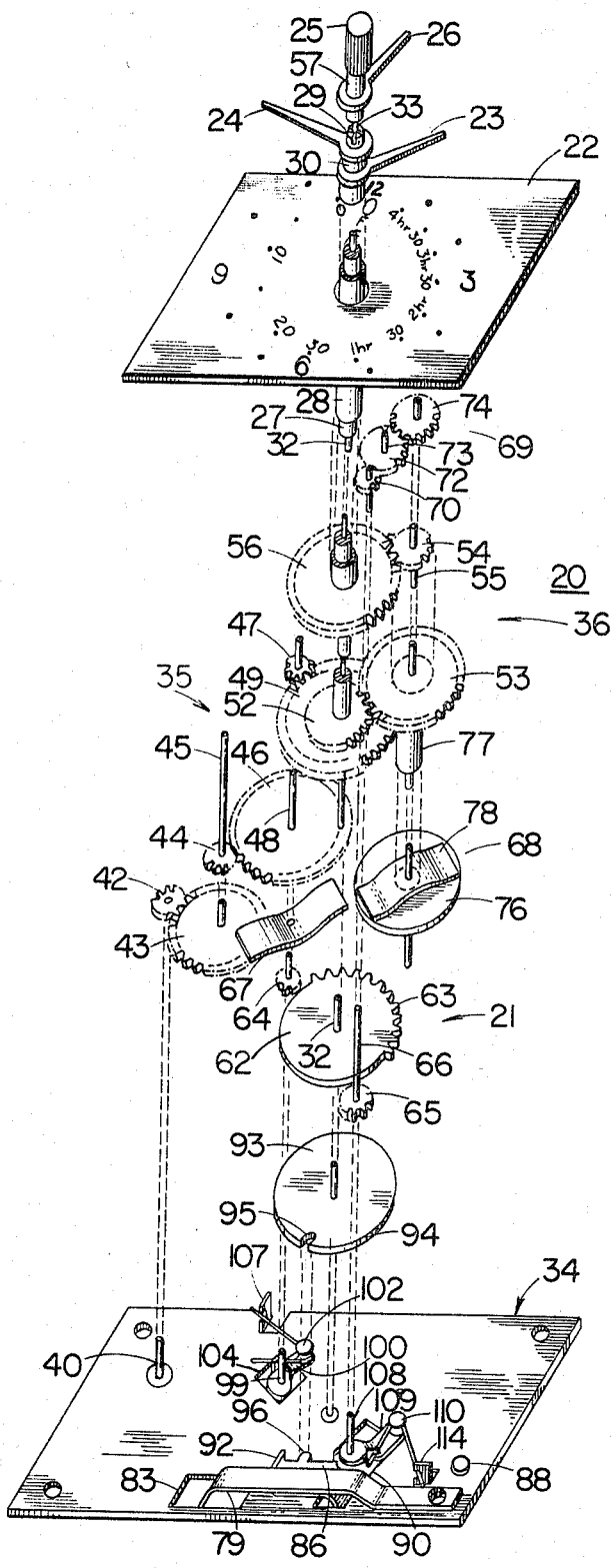
FIGURE 1 is an exploded view in perspective showing the operative parts of a clock mechanism of an interval timer incorporating one form of the invention.

Referring now to the figures of the drawing, there is shown a clock mechanism, generally identified by reference numeral 20. Clock mechanism 20 incorporates a conventional clock face plate 22 having conventional twelve hour indicia marked thereon, as shown. The clock mechanism 20, as will hereinafter be more fully described, drives an hour hand 23 and a minute hand 24. The interval timing mechanism is set by a setting knob 25 having a timing interval hand 26 connected thereto. The face plate 22 also has timing interval indicia printed thereon as shown.

A minute shaft 27 is coaxially disposed within an hour shaft 28, minute hand 24 being secured to and driven by extension portion 29 of the minute shaft 27 which extends upwards beyond upper end 30 of the hour shaft 28, the hour hand 23 being secured to and driven by end 30 of the hour shaft. Setting shaft 32 extends coaxially through the minute shaft 27 with setting knob 25 and setting hand 26 being secured to its upper end 33 which extends upwardly beyond end 29 of the minute shaft 27.

In order to mount the various parts of the mechanism 20, a base plate 34 is provided in spaced parallel relationship with the clock face plate 22 with the minute and hour gear trains 35 and 36 and the interval timing mechanism 21 disposed therebetween. Setting shaft 32 extends downwardly through the clock face plate 22 and base plate 34 and is normally biased upwardly by leaf spring 37 secured to the bottom side of the base plate 34 and engaging the lower end 38 of the setting shaft 32 which projects downwardly through the base plate 34. As will be hereinafter described, manually actuated downward movement of setting knob 25 and setting shaft 32 against the force exerted by leaf spring 37 is required for setting the hour and minute hands 23, 24 to indicate the desired time on the clock face plate 22.

A synchronous clock motor 39 is suitably mounted on the bottom side of the base plate 34 and has an output shaft 40 extending upwardly through the base plate 34 with a driving pinion 42 mounted thereon. It will be understood that an internal gear train 16 is incorporated in the synchronous motor assembly 39.

The minute gear train assembly 35 includes gear 43, pinion 44 on shaft 45, gear 46, pinion 47 on shaft 48, and gear 49 on the minute shaft 27. As is seen in FIGURE 3, motor pinion 42 meshes with and drives gear 43, pinion 44 rotates with gear 43 and meshes with and drives gear 46, and pinion 47 rotates with gear 46 and meshes with and drives gear 49, which in turn rotates minute shaft 27 and the minute hand 24. Shafts 45, 48 of the minute gear train assembly 35 respectively extend between and are journaled in top plate member 50 which underlies clock face plate 22 and the bottom plate member 34. It will be seen that the minute gear assembly 35 provides a predetermined step-down gear reduction between the motor pinion 42 and the minute shaft 27 thereby to rotate minute shaft 27 and the minute hand 24 once during each elapsed hour of time.

The hour gear train assembly 36 includes a pinion 52 on the minute shaft 27, gear 53, a pinion 54 on shaft 55, and gear 56 on the hour shaft 28. Thus, pinion 52 rotates with the minute gear 49 and meshes with and drives gear 53, and pinion 54 rotates with gear 53 and meshes with and drives the hour gear 56, which in turn rotates the hour shaft 28 and the hour hand 23. It will readily be seen that pinion 52, gear 53 pinion 54 and the hour gear 56 form a step-down gear reduction between the minute shaft 27 and the hour shaft 28 thereby to drive the hour shaft 28 and the hour hand 23 through one revolution during each twelve hours of elapsed time.

In order to allow the hour and minute hands 23, 24 to be set, portion 57 of setting knob 25 upon which the interval setting hand 26 is mounted is provided with downwardly extending projections 58 which cooperatively engage notches 59 formed in extension portions 29 of the minute shaft 27 when the setting knob 25 and the setting shaft 32 are manually depressed downwardly in the direction shown by the arrow 60 in FIGURE 3. When setting knob 25 is depressed so as to engage the projections 58 with the notches 59, manual rotation of the setting knob 25 will drive the hour and minute gear trains 36, 35 thereby to set the hour and minute hands 23, 24. As soon as the downward pressure is removed from the setting knob 25, leaf spring 37 which engages the lower projecting end 38 of the setting shaft 32 will bias the setting shaft and setting knob upwardly to the positions as shown in FIGURE 3.

The interval timing mechanism 21 includes driven sector gear 62 mounted on the setting shaft 32 and rotatable therewith. The sector gear 62 is formed with a gear segment 63, and pinions 64 and 65 respectively mounted on shafts 48 and 66 drivingly engage the sector gear 62. Pinion 64 is coupled to gear 46 by means of a slip clutch plate 67 mounted on the bottom side of gear 46. Pinion 64 is rotatably carried on shaft 48 and is driven with gear 46 by slip clutch plate 67 when the gear train 35 is being driven by motor pinion 42. However, by reason of the resistance offered by the remaining elements of the gear trains 35 and 36 coupled to gear 46, when the setting knob 25 is rotated thereby to rotate the sector gear 62 (without being depressed), pinion 64 will be rotated by tooth end segment 63 without thereby rotating gear 46 and the remaining portions of the two gear trains respectively coupled thereto. As will be hereinafter more fully described, pinion 64 is the "fast" driving pinion for the sector gear 62 while pinion 65 is the "slow" driving pinion. It will be seen that pinion 65 is driven by the hour gear train assembly 36 through slip clutch 68 and gear train 69.

The gear train 69 is comprised of pinion 70 on shaft 66 that is connected to and rotatable with pinion 65, pinion 72 rotatably mounted on stub shaft 73 mounted on the bottom side of the top plate member 50, and pinion 74 on shaft 55. Pinion 74 is secured to and rotatable with shaft 55 to which clutch plate 76 is also secured. Gear 53 and pinion 54 of the hour gear train 36 are connected together but are freely rotatably mounted on shaft 55. A depending sleeve portion 77 is connected to gear 53 and engages the spring element 78 of clutch 68. It will be noted that spring element 78 is secured to clutch plate 76 as shown. Thus, when the hour gear train assembly 36 is driven by the motor pinion 42 through the minute gear train assembly 35, gear 53 and its sleeve portion 77 drive clutch 68 thereby to drive pinion 74. Pinion 74 is meshed with gear 72. Since gear 72 in turn is meshed with driving pinion 70, thereby driving the pinion 65. However, again by reason of the resistance to movement offered by the remaining portions of gear trains 35, 36, when setting knob 25 is turned with pinion 65 meshed with tooth segment 63, the sector gear 62 will drive gear 65 but clutch 68 will slip with reference to gear 53 and its sleeve portion 77 so that the interval setting motion is not transmitted to the minute and hour gear trains 35, 36.

In the illustrated embodiment of our invention, we have provided an audible alarm having a vibrator 79 with one end 80 secured to the upper surface of the base plate member 34 and having its other end 82 extending downwardly through opening 83 in the base plate 34 to a point adjacent the magnet frame 84 of the synchronous motor 39, which has energizing coil 85 thereon. Coil 85 of the synchronous clock motor 39 is adapted to be coupled to a source of single phase alternating current, such as 60 cycles, 120 volts (not shown). Thus, the magnet frame 84 is alternately excited and thereby normally excites the vibrator 79 so as to provide an audible buzzing signal.

The vibrator 79 is normally restrained by means of a pivoted latching member 86. As is best seen in FIGURE 2, the latching member 86 has one end 87 pivotally mounted on a pivot 80 at the bottom side of the base plate 34 and has an intermediate portion 89 extending upwardly through opening 90 in the base plate member 34. An upturned flange portion 92 at the end of the portion of latching member 86 disposed on the upward surface of base plate member 34 is adapted to engage vibrator 79 to prevent vibration. When the flange portion 92 is released, the vibrator 79 is free to vibrate under the influence of the magnetic field of the frame 84.

For the purpose of actuating the latching member 86, a cam member 93 is secured to or made integral with the sector gear 62 and rotates therewith. Cam member 93 has a high or dwell surface portion 94 with a notch 95 formed therein. Latch member 86 has a cam follower projection 96 formed thereon and is normally biased into cooperating engagement with cam 93 by means or hairpin spring 97. When the cam follower projection 96 is engaged with the high portion 94 of cam 93, latching member 86 is pivoted outwardly about the pivot pin 88 in the direction shown by the arrow 98 in FIGURE 10 so that the flange 92 engages the vibrator 79 thereby preventing its vibratory action. However, when cam 93 is rotated so that the notch 95 comes into alignment with the cam follower projection 96 on the latching member 86, spring 97 will bias the cam follower projection 96 into notch 95, and flange portion 92 is released from the vibrator 79 to permit it to vibrate under the influence of the magnetic frame 84.

Referring now to FIGURES 1 and 10, it will be seen that the outer end 103 of lever member 100 is positioned in slot 104 formed in the bottom plate 34 and carries the lower end 99 of shaft 48 with its associated gearing. Lever member 100 is biased by hairpin spring 105 toward a position in which pinion 64 will mesh with gear segment 63 of sector gear 62. The hairpin spring 105 has one end engaging a projection 106 formed on lever member 100 and its other end engaging a projection 107 formed from the bottom plate 34. Similarly, the lower end 108 of shaft 66 is carried by lever member 109 which is pivotally mounted on the upper side of the base plate 34 by means of pivot pin 110. The spring-biased lever member 109 has an outer end 111 positioned in a slot 90 and effects a movement of the "slow" pinion 65 toward and away from mesh with sector gear 62. Hairpin spring 112 biases lever member 109 in a direction to move pinion 65 toward mesh with gear segment 63 of sector gear 62. To hold them in biasing relation with the lever member 109, spring 112 has one end engaging a projection 113 formed from lever member 109 and its other end engaging projection 114 formed from the base plate member 34.

Referring now more particularly to FIGURES 9, 13, 14 and 15, it will be seen that the gear segment 63 of the sector gear 62 is formed with short teeth 115, 116 at its opposite ends or at the two extremities of the gear segment 63. The angular extent is indicated by the angle B in FIGURE 9. In their outwardly biased positions shafts 48, 66 are spaced about the same radial distance from the axis of the setting shaft 32 and defining angle A therebetween, as is shown in FIGURE 9. As will be hereinafter more fully described, in the exemplification of our invention the angular extent B of gear segment 63 and the angular spacing A of the shafts 48, 66 are such that in the position shown in FIGURE 9, the sector gear 62 is completely out of mesh with the "fast" and "slow" pinions 64, 65. In the position of the sector gear 62 shown in FIGURE 14, one short tooth 115 is just moving out of mesh with pinion 65 as the other short tooth 116 is moving into mesh with the other pinion 64. In the illustrated embodiment, the two angles A and B are on the order of 160° and 150° respectively, it being understood that neither angle can exceed 180°.

In the illustrated embodiment, clock face 22 has an "OFF" position in alignment with the "12 o'clock" mark, an expanded scale extending from "0" to "30" minutes and a compressed scale extending from "30" minutes to "4" hours. In FIGURE 9 the timing interval setting hand 26, setting shaft 32, and sector gear 62 are shown in the "OFF" position. It will be observed that in this position the tooth segment 63 of the sector gear 62 is completely out of mesh with the fast and slow pinions 64, 65.

When it is desired to initiate and interval timing period, the setting knob 25 is manually rotated in a counterclockwise direction shown by the arrow 119 in FIGURE 9 thereby rotating setting shaft 32, sector gear 62 and cam 93 in a counterclockwise direction, such rotation being provided without depressing setting knob 25. Assuming now that the maximum four hour timing interval is desired, setting knob 25, setting hand 26 and setting shaft 32 will be so rotated in the counterclockwise direction until sector gear 62 is in one extreme rotational position shown in FIGURE 13 in which the setting hand 26 has been rotated from the "OFF" position counterclockwise to the "4 hour" position. With this counterclockwise rotation of sector gear 62, the gear segment 63 is rotated first past the fast drive pinion 64 and then past the slow drive pinion 65, the resultant rotation of pinions 64, 65 being accommodated by the slip clutches 67, 68 without accompanying rotation of the respective gear trains.

It will be observed that in the "4 hour" position of sector gear 62 shown in FIGURE 13, the short tooth 116 at one extremity of the gear segment 63 has been rotated in direction 119 from its position shown in FIGURE 9 to a position where it is now in mesh with the "slow" pinion 65, the other short tooth 115 at the other extremity of the gear segment 63 being completely out of mesh with the "fast" pinion 64.

As soon as the counterclockwise setting rotation of the sector gear 62 in response to manual actuation of setting knob 25 is terminated, the slow pinion 65, which is now meshed with gear segment 63, will begin to rotate the sector gear 62 in a clockwise direction toward the "OFF" position. It will be understood that the ratio provided by the gear train 69 is such that the sector gear 62 and the interval hand 26 will be rotated from the "4 hour" mark on the compressed scale to the "30 minute" mark for a three and one-half hour interval.

After three and one-half hours during which time the timing interval hand 26 and the sector gear 62 have been rotated by the "slow" pinion 65 from the "4 hour" mark to the "30 minute" mark on the dial, the sector gear 62 has reached the intermediate rotational position shown in FIGURE 14. In this position the short tooth 115 now passes out of mesh with the "slow" pinion 65 and the other short tooth 116 at the other extremity of the gear segment 63 is just coming into mesh with the "fast" pinion 64. It will now be seen that continued rotation of the "slow" pinion 65 in the direction 120 will have no further effect on the sector gear 62 since it is now out of mesh with gear segment 63. However, the "fast" pinion 64 now takes over and rotates sector gear 62 in a clockwise direction toward the "OFF" position of FIGURE 9 but at a faster rate. It will be observed that the "fast" pinion 64 is rotated by the motor pinion 42 through the minute gear trains 35 and the slip clutch 67 and is driven at a relatively faster rate of speed than pinion 66.

The "fast" pinion 64 now rotates the sector gear 62, the setting shaft 32 and the interval hand 26 from the "30 minute" mark on the expanded scale to the "0" mark shown in FIGURE 15. When the "0" mark is reached, the short tooth 115 passes out of mesh with the "fast" driving pinion 64 and further rotation of the sector gear 62 and timing interval hand 26 is thus terminated. Thus, at the end of the timing interval hand 26 is in alignment with the "0" mark on clock face 22.

Further, in the "0" mark position the cam follower projection 96 of latching member 86 engages notch 95 and flange 92 is moved out of engagement with vibrator 79 thereby releasing the vibrator 79 to provide a buzzing alarm.

In order to terminate this alarm, the sector gear 62 is manually moved by setting knob 25 in a clockwise direction from the "0" mark to the "OFF" position shown in FIGURE 9. With this movement the cam follower projection 96 on the latching member 86 passes out of the notch 95 so that the flange portion 92 again restrains the vibratory action of the vibrator 79, as shown in FIGURE 10.

While we have described above the operation of the dual interval timer of the invention for a maximum timing interval (four hours in the illustrated embodiment), it will be readily understood that the interval timer may selectively be set for shorter intervals. If setting knob 25 is rotated in the counterclockwise direction so as to position the interval timing hand 26 at the two hour thirty minute mark on the compressed scale, sector gear 62 will be correspondingly rotated to a point where the slow pinion 65 is in mesh with the gear segment 63 of sector gear 62 generally midway between the two short teeth 115, 116. Thereafter, the drive-out operation proceeds in a manner identical to that above described.

If the timing interval desired is thirty minutes or less, the sector gear 62 will be rotated in the counter-clockwise direction by the setting knob 25 to a point at which toothed segment 63 remains in mesh with the fast driving pinion 64 and will thereafter be driven out in a clockwise direction solely by the fast driving pinion 64.

It will be observed that in the transition from the "slow" drive to "fast" drive out, both driving pinions 65, 64 are actually in mesh with the teeth at the ends of the gear segment 63 for a short period of time. The spring-biased pivotal mounting of pinions 64 and 65 permits the fast driving pinion 64 to be moved outwardly against the force exerted by the hairpin spring 105 until the fast driving pinion 64 and the teeth of the toothed segment 63 are properly in mesh. In the illustrated embodiment of the invention, the pivotal lever member 100 and the hairpin spring 105 are arranged so that the force exerted by the spring is essentially in the direction shown by the arrow 124 in FIGURES 9 and 14 in alignment with a line extending radially through the axis of the setting shaft 32 and the axis of the pinion shaft 48. The short teeth 115, 116 at the two extremities of the gear sector 63 cooperate with the spring-biased pivotal mounting of the driving pinions 64, 65 to facilitate the pinions moving in and out of mesh with gear sector 63 during both the timing operation and the setting operation.

While the interval timing mechanism of the invention is illustrated and described as having an expanded scale of thirty minutes and a compressed scale of three and one-half hours, it will be readily seen that expanded scales for intervals such as ten minutes, fifteen minutes, twenty minutes, etc., and compressed scales for other intervals such as one hour, one and a half hours, two hours, etc., can be provided by appropriate changes in the gear ratios and/or number of teeth on the gear segment 63 of the sector gear 62.

Referring now briefly to FIGURE 12, gear 49 has a hub portion 126 with a recess 127 formed therein and with a "stop" portion 128 extending into the recess, "stop" portion 128 having an angular extent corresponding to and oriented with the angle D shown in FIGURE 9 between the "OFF" position and the "4 hour" setting of the compressed or slow scale. Setting shaft 32 has a pin 129 extending therefrom which engages stop 128 in the "OFF" position and which engages the other side of stop 128 in the "4 hour" setting. It will be understood that the timing interval hand 26 will be rotated during resetting of the hour and minute hands 23, 24. Thus, when the resetting operation is completed and the downward manual pressure on resetting knob 25 and resetting shaft 32 is removed so that spring 37 returns the resetting knob and resetting shaft to their normal positions, it is then necessary manually to rotate resetting knob 25 in the clockwise direction 122 so as to return the sector gear 62 and the timing interval hand 26 to their "OFF" positions as shown in FIGURE 9.

From the foregoing description it will now be apparent that we have provided an improved interval timer incorporating a minimum number of parts and having rugged and dependable operating characteristics.

Further, it will be apparent that many modifications of the particular embodiment described herein may be made.

What we claim as new and desire to secure by Letters Patent of the United States is:

1. An interval timer comprising: a dial means having first and second sequentially arranged time scales with timed interval settings marked thereon; a rotatable time indicating member including a sector gear of predetermined angular extent and also including means for manually rotating said time indicating member in one direction from a zero time setting at the end of said second scale remote from said first scale to a selected timed interval setting on said first scale; first and second driving pinions arranged to be successively meshed, one at a time, with said sector gear to drive said time indicating member from said selected timed interval setting to said zero time setting in a direction opposite to said one direction thereby to measure said selected timed interval, said first pinion being in mesh and said second pinion being out of mesh with said sector gear at said selected timed interval setting; a synchronous electric motor; and a driving gear means for coupling said synchronous electric motor and said first and second driving pinions to drive said first and second driving pinions at first and second predetermined speeds, respectively, said first driving pinion initially driving said sector gear and said timed indicating member from said selected timed interval setting on said first time scale at said first predetermined speed to the starting end of said second time scale, said second pinion being in mesh and said first pinion being out of mesh with said sector gear at said starting end of said second scale, said second driving pinion thereafter driving said sector gear and said time indicating member at said second predetermined speed to said zero time setting thereby to measure said selected timed interval, both of said pinions being out of mesh with said sector gear at said zero time setting.

2. The interval timer set forth in claim 1 further comprising clutch means for respectively uncoupling both of said driving pinions from said driving gear means when the time indicating member is manually rotated in said one direction.

3. The interval timer set forth in claim 1 further comprising means for mounting both of said first and second driving pinions for movement toward and away from said sector gear, and a spring means for normally urging said first and second driving pinions toward said sector gear thereby facilitating the unmeshing and meshing of said first and second driving pinions respectively with said sector gear when said time indicating member is driven from the first time scale to the second time scale.

4. The interval timer set forth in claim 1 wherein at least one tooth at each end of said sector gear is shorter in length than the other teeth of said sector gear.

5. An interval timer comprising: means for defining first and second sequentially arranged time scales; a rotatable time indicating member including a gear formed with a gear segment having a predetermined angular extent; means for manually advancing said time indicating member in one direction to selected time interval positions; a pair of driving pinions engageable with said gear segment of the time indicating member; means for respectively rotating said driving pinions at different speeds, said pair of driving pinions being arranged successively to mesh, one at a time, with said gear segment to rotate said time indicating member in the direction opposite said one direction from a selected time interval position on said first time scale through said second time scale to a zero time position thereby to measure said selected timed interval and only one of said driving pinions drivingly meshing with said gear segment to rotate said time indicating member in said opposite direction from a selected timed interval position on said second time scale to return the time indicating member to said zero time position thereby to measure said last-named selected timed interval.

6. The interval timer set forth in claim 5 further comprising slip clutch means for respectively decoupling said driving pinions from said means for rotating said pinions when said time indicating member is rotated manually in said one direction.

7. The interval timer set forth in claim 5 further comprising means for mounting each of said driving pinions for movement toward and away from said gear segment, and a biasing means for normally urging said driving pinions toward said gear segment thereby facilitating the meshing and unmeshing of said driving pinions with said gear segment.

8. The interval timer set forth in claim 5 wherein at least one tooth at each extremity of said gear segment is shorter than the other teeth comprising said gear segment.

References Cited
UNITED STATES PATENTS 2,620,872  12/1952  Wyman _____ 58—38
2,864,443  12/1958  Niemand _____ 58—39.5

FOREIGN PATENTS 690,178  7/1964  Canada.

RICHARD B. WILKINSON, *Primary Examiner.*

EDITH C. SIMMONS, *Assistant Examiner.*

U.S. Cl. X.R.

58—39